INVENTORS
DONALD M. LAWRENCE, DAVID GREGG
AND MYRON L. TAYLOR
By Herbert L. Davis, Jr.
ATTORNEY

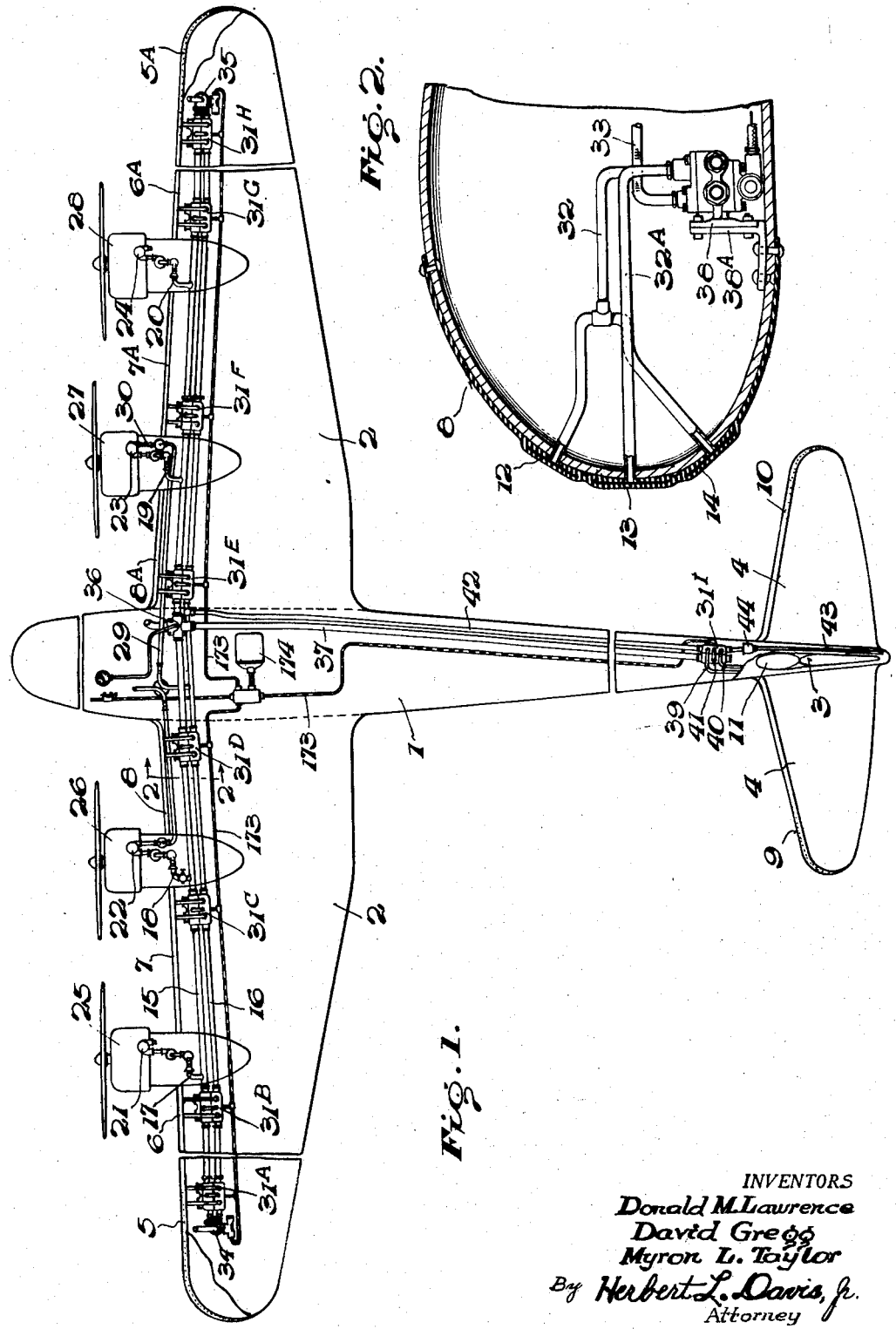

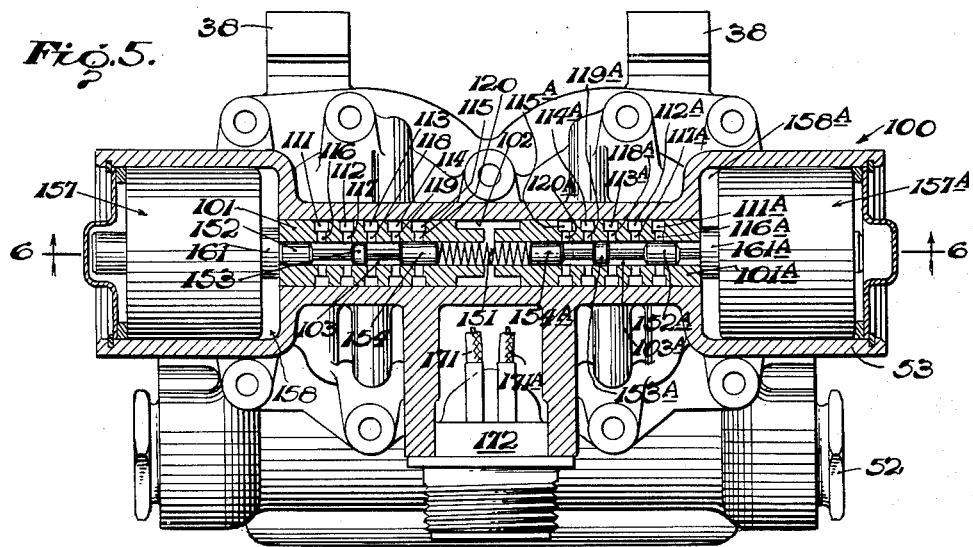
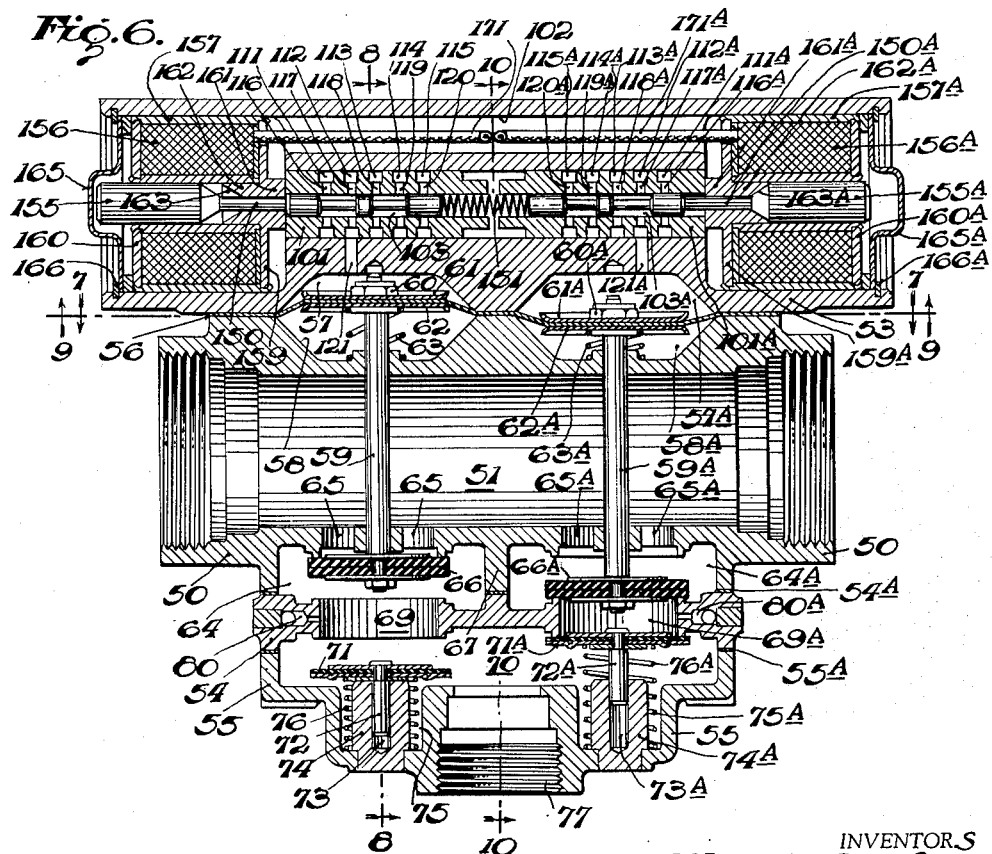

INVENTORS
DONALD M. LAWRENCE, DAVID GREGG
AND MYRON L. TAYLOR

By Herbert L. Davis, Jr.
ATTORNEY.

July 18, 1950　　　　　D. M. LAWRENCE ET AL　　　　2,515,519
　　　　　　　　AIR DISTRIBUTOR VALVE AND SYSTEM FOR THE
　　　　　　　　　ELIMINATION OF ICE FROM AIRCRAFT
Filed Aug. 11, 1943　　　　　　　　　　　　　　11 Sheets-Sheet 5

INVENTORS
DONALD M. LAWRENCE, DAVID GREGG
AND MYRON L. TAYLOR

By Herbert L. Davis, Jr.
　　　　ATTORNEY

INVENTORS
Donald M. Lawrence,
David Gregg, Myron L. Taylor.
By Herbert L. Davis, Jr.
Attorney

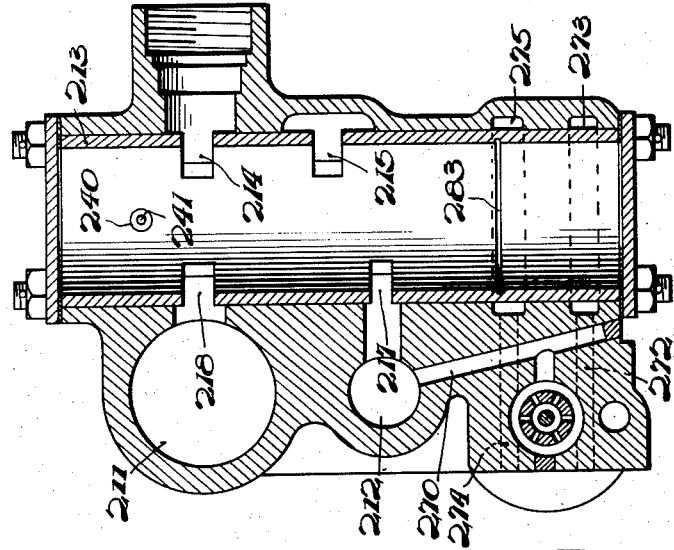
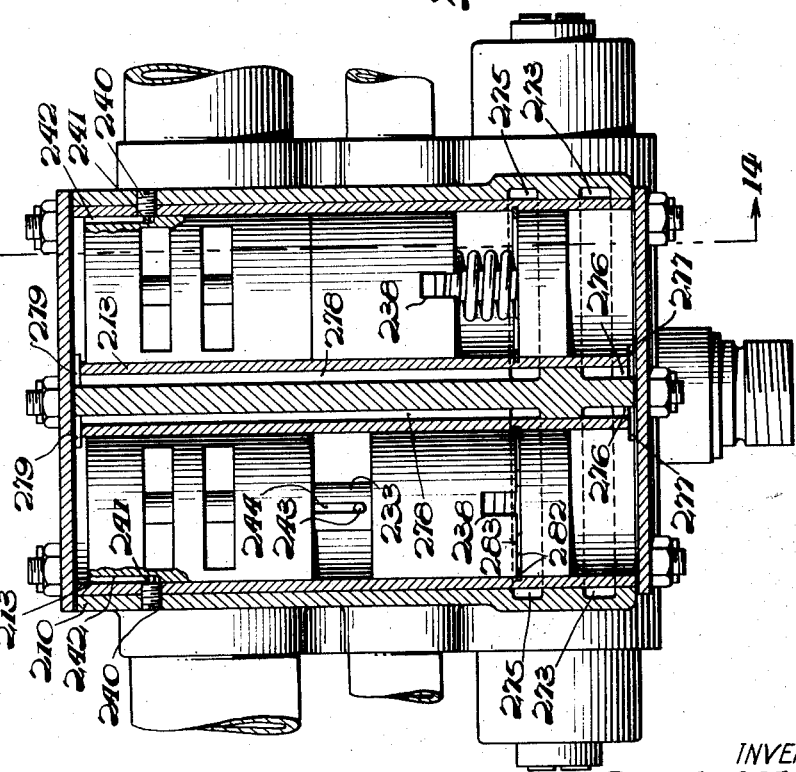

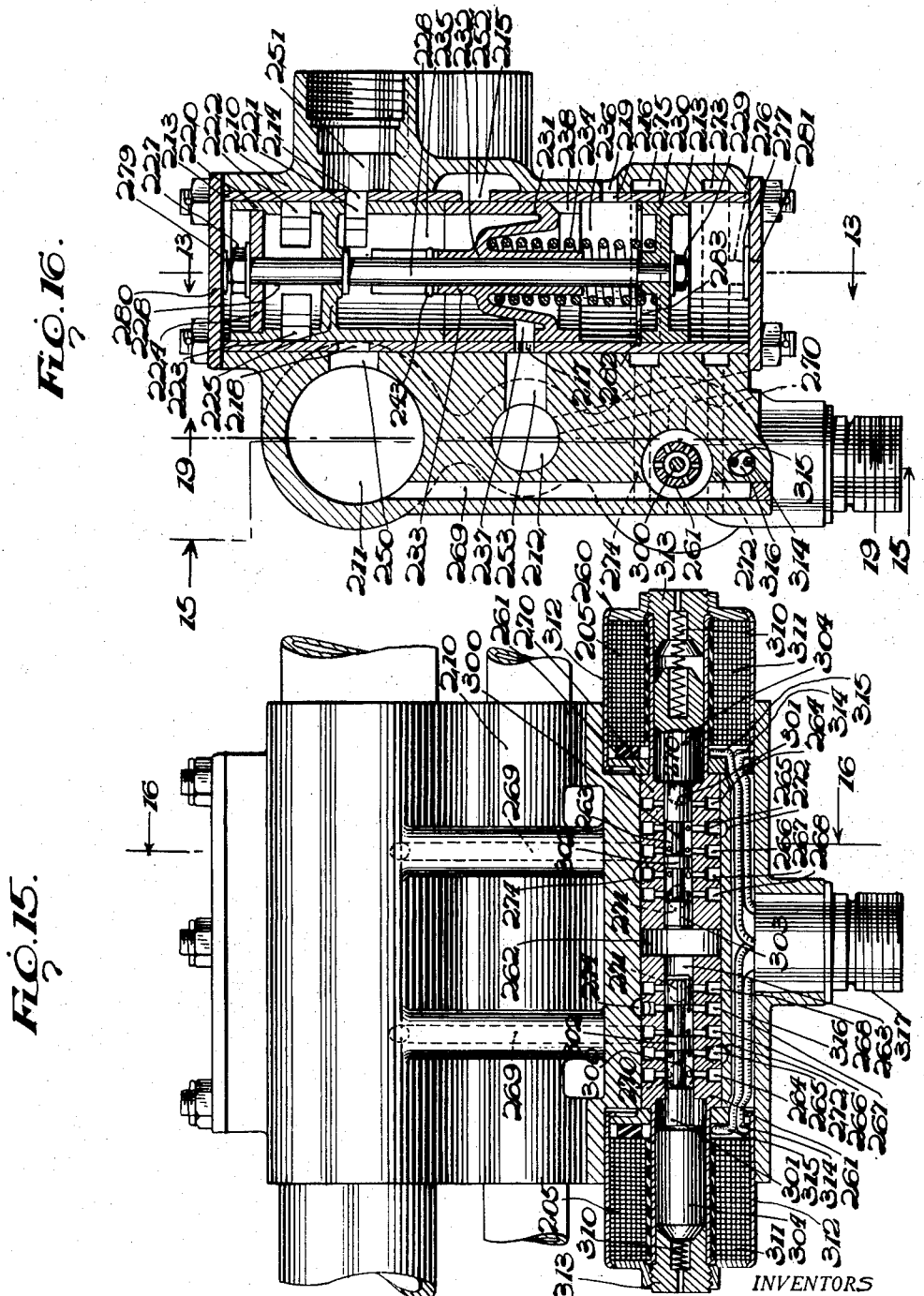

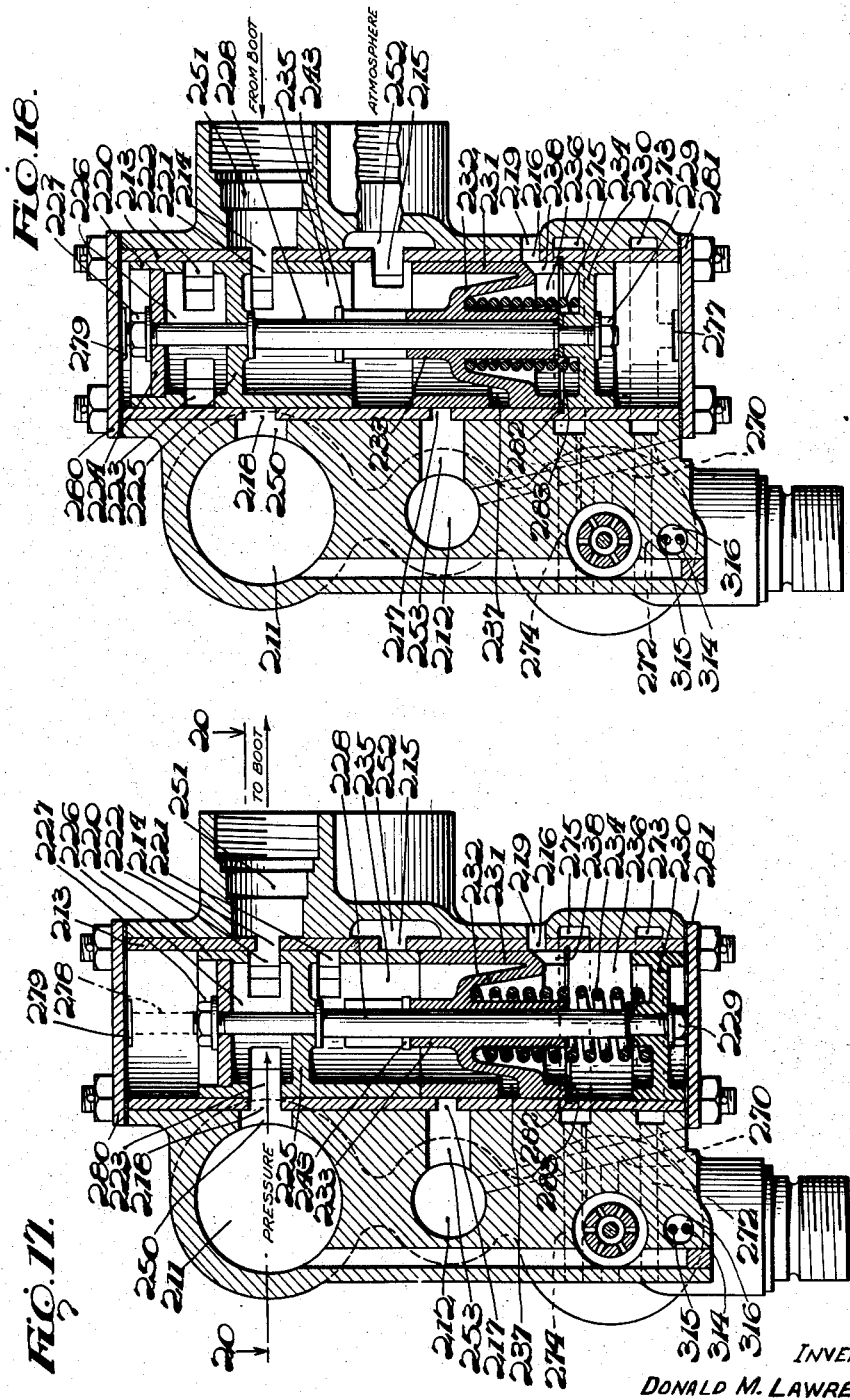

July 18, 1950
D. M. LAWRENCE ET AL
2,515,519
AIR DISTRIBUTOR VALVE AND SYSTEM FOR THE
ELIMINATION OF ICE FROM AIRCRAFT
Filed Aug. 11, 1943
11 Sheets-Sheet 10
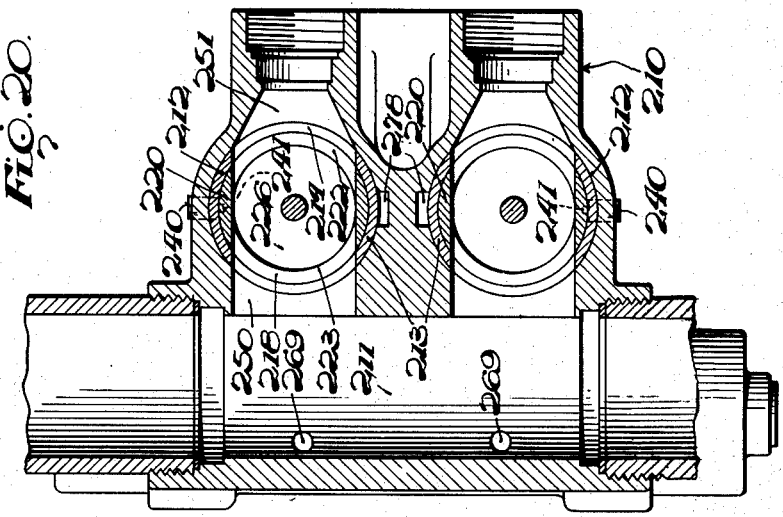
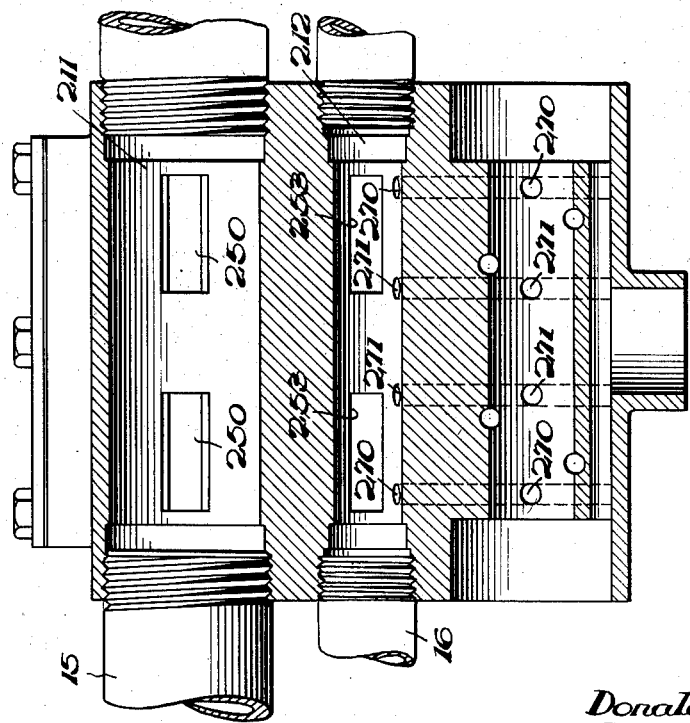
INVENTORS
Donald M. Lawrence
David Gregg
Myron L. Taylor.
By Herbert L. Davis, Jr.
ATTORNEY.

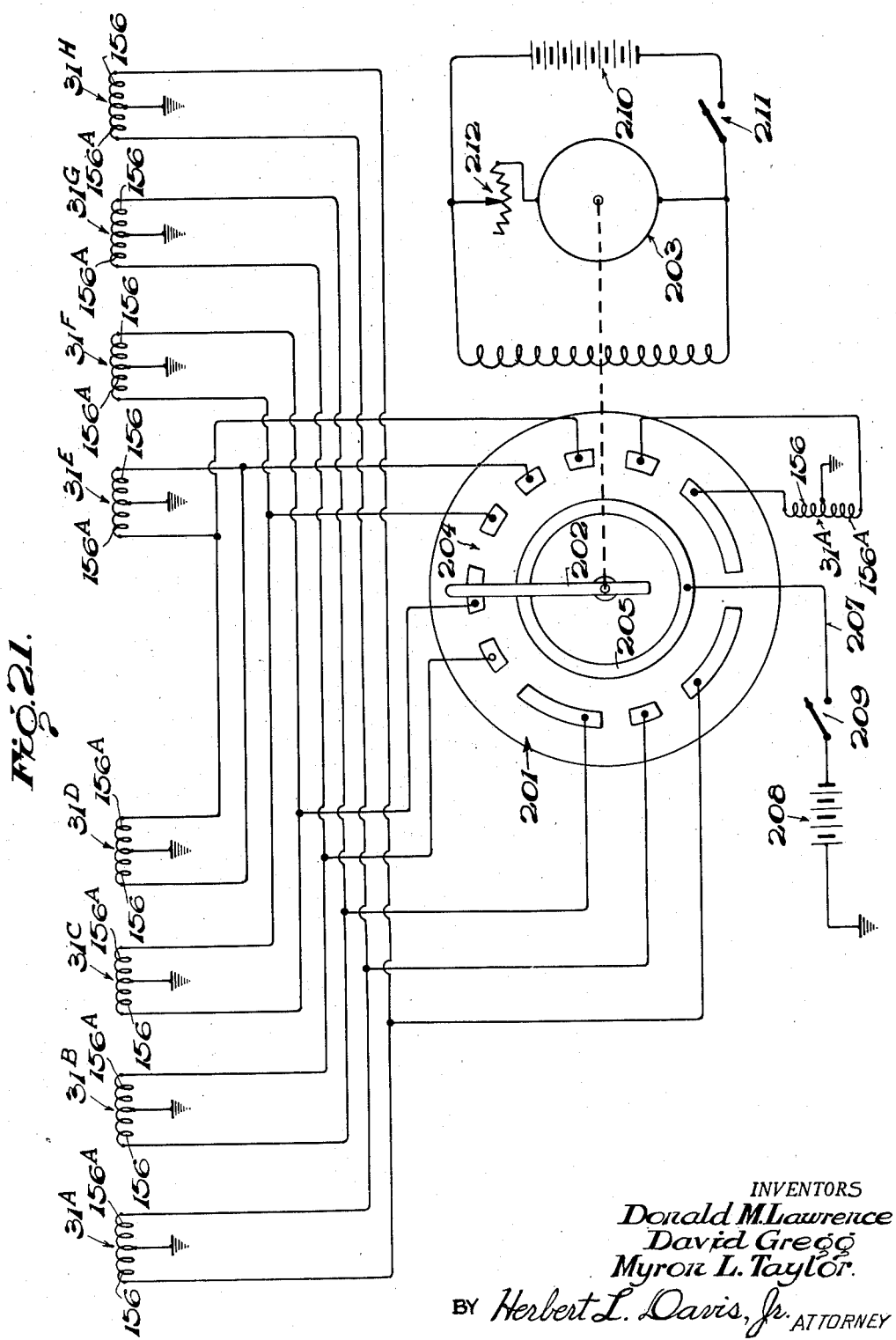

Patented July 18, 1950

2,515,519

UNITED STATES PATENT OFFICE 2,515,519

AIR DISTRIBUTOR VALVE AND SYSTEM FOR THE ELIMINATION OF ICE FROM AIRCRAFT

Donald M. Lawrence and David Gregg, Caldwell, and Myron L. Taylor, Ridgewood, N. J., assignors to Bendix Aviation Corporation, Teterboro, N. J., a corporation of Delaware Application August 11, 1943, Serial No. 498,248

11 Claims. (Cl. 244—134)

Our present invention relates to pressure medium controls, valves, systems, and methods and more particularly to valve controls.

In inflatable systems for the removal of ice from aircraft, several arrangements of distributing valves and air pressure utilization for flexible boot members have been shown and described in the prior art. Many of these systems have utilized large amounts of complicated air conduit supplied with air from a central motor-driven distributor valve for the distribution of air under pressure to the boot elements for the breaking up and elimination of ice forming over the leading edges of wings and tail surfaces.

An object of our invention, however, is to provide novel distributing systems, methods and valves whereby a single pressure manifold and a single suction manifold may be utilized for the distribution of pressure and suction forces to flexible boot members provided on the airfoil surfaces from which ice is to be eliminated.

Another object of our invention is to provide a novel pressure and suction distribution system for the operation of inflatable boots for the removal of ice from aircraft.

Another object of our invention is to provide a novel method and control system for eliminating ice from an aircraft surface whereby an ice eliminating unit may be automatically actuated for a time period variable in accordance with actual icing conditions.

Another object of our invention is to provide a plurality of inflatable units mounted at the leading edge of an aircraft, and novel manual adjustable control means for inflating the said units for an interval of time proportionate to the air capacity thereof and for a period variable in accordance with actual icing conditions.

Another object of our invention is to provide a novel distributor valve block having channels arranged for forming pressure and suction conduits extending through the valve block and so arranged as to form the principal support for the main suction and pressure lines of the system.

Another object of our invention is to provide a novel distributing valve having means for directing biasing forces so as to operate the distributor valve in such a manner as to exert pressure and suction forces through several ports in a predetermined sequence for controlling an inflatable boot.

Another object of our invention is to provide a novel distributor valve having primary and secondary valve portions normally biased into exhaust and suction port closing position while directing pressure forces into an inflatable boot, but which valve portions, when adjusted for discharging such pressure forces from the boot, are arranged to successively open and then close the exhaust port in response to the pressure forces within the boot so as to permit suction forces to be applied to the boot upon termination of the exhaust stage.

Another object of our invention is to provide a novel sliding valve arrangement including primary and secondary valve portions normally biased into engaging relation and adapted to separate under force of a pressure medium so as to open an exhaust port, but which valve portions are biased into engaging relation upon the force of the pressure medium reaching a predetermined minimum value so as to automatically open a suction port and close the exhaust port.

Another object of our invention is to provide a novel poppet type valve and a differential pressure operated diaphragm for actuating said poppet type valve so as to control the distribution of a pressure medium.

Another object of our invention is to provide a rapid acting differential pressure responsive means for operating a valve, and a relatively low motive force power means for controlling the operation of said differential pressure responsive means.

Another object of our invention is to provide an electromagnetically controlled pilot valve for controlling the operation of a differential pressure actuated diaphragm, and said diaphragm arranged so as to operate a poppet type valve for controlling the distribution of a fluid pressure medium.

Another object of our invention is to provide a novel control valve for inflatable boots so arranged as not to require close tolerances between moving parts of said control device, whereby the control valve may be readily operated under extremely variable temperature conditions without danger of seizure of the device through the expansion or contraction of the moving ports thereof, due to such temperature conditions.

Another object of our invention is to provide a novel poppet type valve arrangement whereby in response to the forces generated by a pressure medium in excess of a predetermined value, a valve will open so as to permit the egress of said pressure medium through an exhaust port, while upon the forces generated by such pressure medium reaching a predetermined minimum value said valve will close said exhaust port and cause the application of a suction force to said remaining pressure medium.

Another object of our invention is to provide a novel unitary double valve distributor for controlling the operation of alternate inflation elements of an inflatable member.

Another object of our invention is to provide a novel electrically controlled pilot valve wherein the distribution of air and suction forces may be controlled for operation of a main distributor valve.

Another object of our invention is the provision of a distributing valve structure for aircraft ice elimination systems wherein a predetermined cycle of operation may be effectively carried out with the minimum of weight and initiating power.

Another object of our invention is to provide a novel pressure distribution system comprising the mounting of a plurality of distributor valves along a pair of main pressure and suction conduits so as to serve as convenient mounting means for such conduits and as conduits for the main pressure and suction forces conveyed thereby, while there is provided by each of said valves automatic means for independently distributing pressure and suction forces to separately inflatable members.

A further object of our invention is to provide a compact distributor valve of great efficiency in comparison to its size and of such simplicity in construction as to adapt it for manufacture and installation at low cost.

Other objects and advantages of this invention are set forth in the following description, taken with the accompanying drawings; and the novel features thereof are pointed out in the appended claims. The disclosure, however, is illustrative only and we may make changes in detail, especially in matters of shape, size and arrangement of parts within the principle of the invention to the full extent indicated by the broad and general meanings of the terms in which the appended claims are expressed.

In the accompanying drawings which form a part of this specification like characters of reference indicate like parts in the several views wherein:

Figure 1 is a diagrammatic plan view of an aircraft showing a pressure distribution system for inflatable units connected for operation in accordance with our invention.

Figure 2 is a somewhat enlarged cross-sectional view of an airplane wing taken along the lines 2—2 of Figure 1 and looking in the direction of the arrows.

Figure 5 is a cross sectional view of the pilot control valve taken along the lines 5—5 of Figure 4 and looking in the direction of the arrows.

Figure 6 is a cross sectional view of Figure 5 taken along the lines 6—6 and looking in the direction of the arrows.

Figure 13 is a longitudinal sectional view taken along the line 13—13 of Figure 16 and looking in the direction of the arrows with the distributor valve mechanism only partly broken away.

Figure 14 is a longitudinal sectional view taken along the line 14—14 of Figure 13 looking in the direction of the arrows with the distributor valve mechanism removed.

Figure 15 is a view partly in section taken along the lines 15—15 of Figure 16 and looking in the direction of the arrows.

Figure 16 is a cross-sectional view taken along the line 16—16 of Figure 15 and looking in the direction of the arrows with the pressure distributor valve mechanism adjusted so as to cause the application of suction to a deflated tube operated thereby.

Figure 17 is a cross-sectional view similar to Figure 16 showing the pressure distributor valve mechanism adjusted so as to cause the application of pressure to the tube operated thereby.

Figure 18 is a similar view to Figure 17 showing the pressure distributor valve mechanism adjusted so as to cause the exhaust of the pressure medium from the tube.

Figure 19 is a longitudinal sectional view taken along the line 19—19 of Figure 16 and looking in the direction of the arrows.

Figure 20 is a cross-sectional view taken along the line 20—20 of Figure 17 and looking in the direction of the arrows.

Figure 21 is a diagrammatic view of a modified form of electrical control circuit for operating the pressure distribution system of Figure 1.

Figure 3:
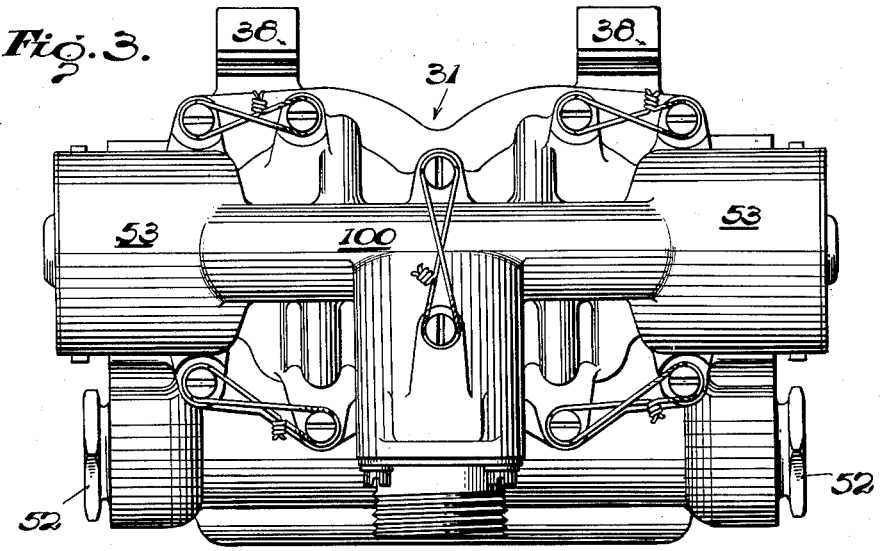
Figure 3 is an enlarged bottom plan view of a distributor valve of the type shown in Figures 1 and 2.

Referring first to Figure 1, the invention is illustrated as applied to an airplane comprising a fuselage 1 having wings 2, and vertical and horizontal stabilizers 3 and 4, respectively.

A plurality of inflatable boots or units are mounted at the leading edge of the wings 2. These inflatable units are indicated on the forward port wing by the numerals 5, 6, 7 and 8, while on the starboard wing corresponding inflatable units are indicated by numerals 5A, 6A, 7A and 8A. Inflatable units are further provided at the leading edge of the horizontal stabilizers indicated at the port side by the numeral 9 and at the starboard side by the numeral 10. A further inflatable unit 11 is provided at the leading edge of the vertical stabilizer as shown in Figure 1. The latter inflatable units 9, 10 and 11 are operated together as will be explained.

Each of the said inflatable units are constructed of elastic rubber-like material suitably reinforced and secured upon the wing or other airfoil and each unit comprises one or more inflatable tubes. In the illustrated embodiment each unit comprises three tubes for inflation, indicated in Figure 2 by the numerals 12, 13 and 14. The tubes 12 and 14 are arranged for inflation and deflation together, while the tube 13 is separately inflatable from the tubes 12 and 14 as will be explained.

Extending spanwise of the forward wing 2 are main air pressure and suction conduits indicated by numerals 15 and 16, respectively. The air pressure conduit 15 is connected by conduits 17, 18, 19 and 20 to suitable air pressure pumps 21, 22, 23 and 24 driven by airplane motors 25, 26, 27 and 28, respectively. The suction conduit 16 is connected by a conduit 29 to a suction inlet conduit 30 of pump 23 driven by the motor 27.

As shown in Figure 1 we have mounted in the wing separate distributor valve units 31 for independently controlling the inflation and deflation of the aforesaid inflatable units. The said distributor valve units have been separately indicated as 31A, 31B, 31C, 31D, 31E, 31F, 31G, and 31H. The said distributor valves are connected directly into the main pressure and suction lines 15 and 16, respectively, as shown in Figure 1 and serve as part of the conduits for the main pressure and suction forces.

Further, the distributor valves 31 control the inflation and deflation of the inflatable tubes 12 and 14 of each unit through a conduit 32, while the tube 13 is controlled through a conduit 32A. The exhaust pressure from the said tubes 12, 13 and 14 is conducted outward through the exhaust or overboard conduit 33 during deflation of the tubes 12, 13 and 14 as will be explained.

Suitable footed portions 38 are provided on the distributor valves 31 for mounting the main pressure and suction lines 15 and 16 and the distributor valves 31 to the mounting brackets 38A affixed within the wing as shown in Figure 2.

Provided at the opposite ends of the spanwise extending conduits 15 and 16 are manifold unloading valves 34 and 35 for releasing the pressure within the line 15 when the de-icers are not in use. The said manifold unloading valves are preferably of the type described in the copending application of Myron L. Taylor and Samuel K. Lehman, Serial No. 498,249, filed August 11, 1943, now U. S. Patent No. 2,405,362, granted August 6, 1946, and owned by the assignee of the present application.

A suitable relief valve 36 is mounted intermediate the opposite ends of the spanwise extending pressure conduit 15 for relieving the pressure within the conduit 15 upon the same increasing beyond a predetermined maximum value.

There is connected at the relief valve 36 a second pressure line 37 which extends longitudinally of the plane to a distributor valve 311 positioned at the rear of the plane and of like construction to the distributor valves 31 previously noted. The distributor valve 311 is arranged for controlling through the conduits 39 and 40 the inflation and deflation of tubes provided within the inflatable units 9, 10, and 11, which correspond to the tubes 12, 13, and 14 previously described. The exhaust pressure from the tubes 12, 13, and 14 during deflation is conveyed outward through conduit 41.

A suction line 42 connects the said distributor valve 38 to the main suction line 16. A second suction line 43 extends from the distributor valve 38 to the low pressure area of the plane. A suitable control valve 44 regulates the line 43 so as to open the same upon a decrease in the suction force exerted at the line 42 below a predetermined minimum value so as to exert in such event an added suction force to the line 42. The distributor valves 31 shown in Figure 1 may all be of identical construction and therefore only one will be described.

Figure 4:
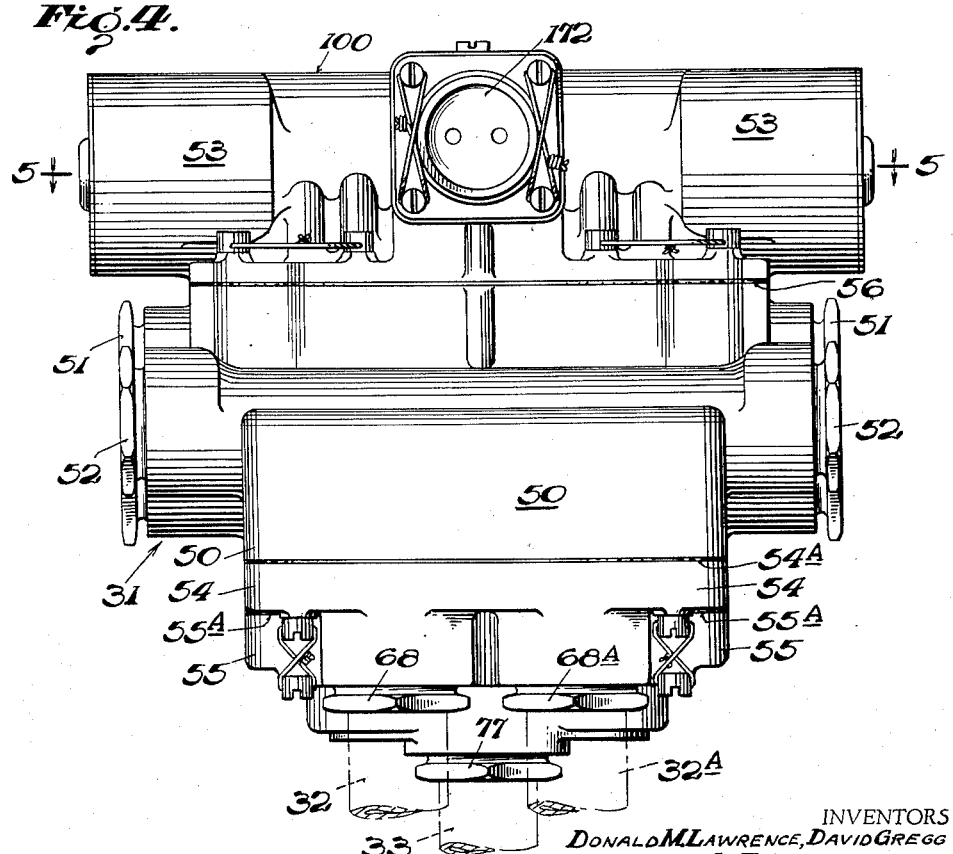
Figure 4 is an inverted side elevational view of Figure 3.

Referring now to Figures 3 and 4, the solenoid distributor valve may comprise a manifold block 50 through which there extends longitudinally pressure and suction channels 51 and 52, respectively. The inner ends of the said channels 51 and 52 are provided with fittings for securing the end of sections of the pressure and suction conduits 15 and 16, respectively.

Figure 7:
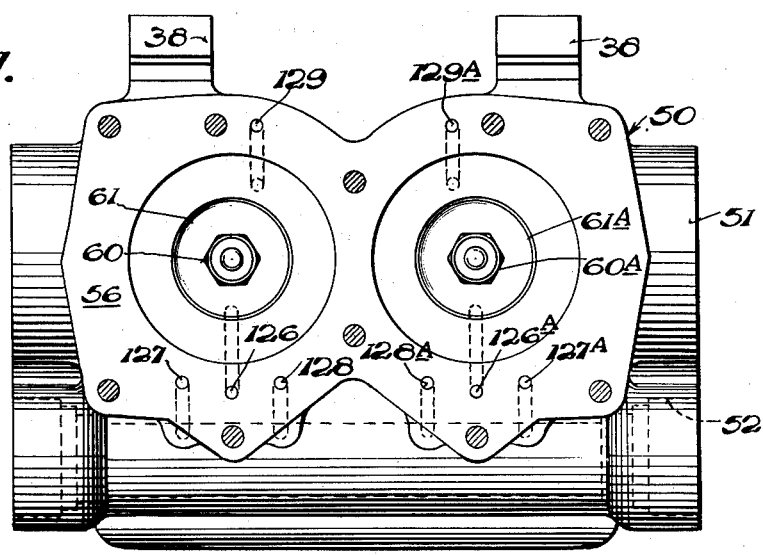
Figure 7 is a cross sectional view of Figure 6 taken along the lines 7—7 and looking in the direction of the arrows.
Figure 8:
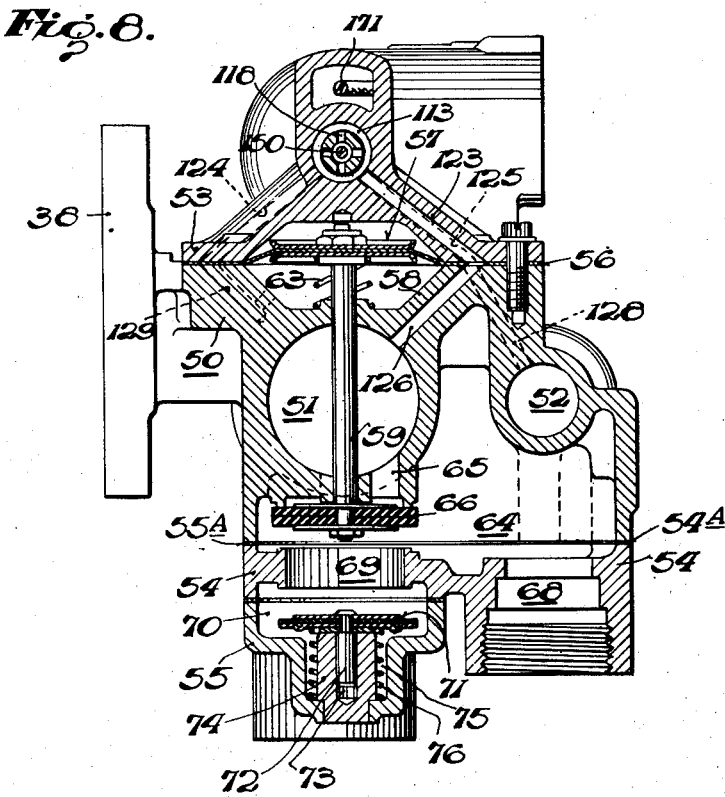
Figure 8 is a cross sectional view of Figure 6 taken along the lines 8—8 and looking in the direction of the arrows.

Carried by the manifold block 50 are the footed portions or bracket members 38 as shown in Figures 2, 7, and 8 whereby the distributor valves and suction and pressure lines may be securely mounted within the interior of the wings of an airplane.

Mounted on the manifold block 50 to one side of the footed portions 38 is a head block 53, while mounted at the opposite side of the head block 53 is a second head block 54 on which there is in turn mounted a third block 55. The blocks 53, 54, and 55 are fastened to the manifold block 50 by suitable fastening bolts as shown in Figures 3 and 4. Suitable sealing gaskets 54A and 55A are positioned between the block 50 and the block 54, and the block 54 and the block 55, respectively.

Secured between the head block 53 and the manifold block 50 is a flexible diaphragm 56 which may be formed of any suitable resilient material. The head block 53 has formed therein the recesses 57 and 57A. Recesses 58 and 58A are provided in the manifold block 50 oppositely disposed in relation to the recesses 57 and 57A, respectively, so as to provide oppositely disposed chambers separated by the diaphragm 56.

A valve stem 59 is fastened at one end by a nut 60 to plates 61 and 62 clamped at opposite sides to the resilient diaphragm 56. The plates 61 and 62 are arranged for movement between the recesses 57 and 58. An expansion spring 63 mounted within the recess 58 bears upon the plate 62 so as to bias the valve stem 59 longitudinally toward the recess 57.

The valve stem 59 extends from the chambers formed by the recesses 57 and 58 through the pressure manifold 51 into a second chamber 64. Leading into the second chamber 64 from the pressure manifold 51 are ports 65, which are controlled by a valve member 66 formed of suitable resilient rubber like material mounted at the opposite end of the valve stem 59 from the diaphragm 56.

A similar valve stem 59A is fastened at one end by a nut 60A to plates 61A and 62A clamped at opposite sides of the diaphragm 56, and arranged for movement between the recesses 57A and 58A. An expansion spring 63A mounted within the recess 58A bears upon the plate 62A so as to bias the valve stem 59A toward the recess 57A so as to close the ports 65A.

The valve stem 59A extends into a second chamber 64A. Leading into the second chamber 64A from the pressure manifold 51 are ports 65A which are controlled by a valve member 66A formed of resilient rubber like material, and mounted at the opposite end of the valve stem 59A. The chambers 64 and 64A are separated by a partition 67 as shown in Figure 6.

The chamber 64 has an outlet conduit 68, Figure 8, for connection to the conduit 32 and a second outlet conduit 69. One end of the conduit 69 opens directly into the chamber 64, while the opposite end of the conduit 69 opens directly into a second chamber 70. The opening of the conduit 69 leading directly into the chamber 64 is controlled by the valve 66, while the opposite opening of the conduit 69 leading directly into the chamber 70 is controlled by a valve 71. The valve 71 is carried by a pin 72 slidably mounted in a channel 73 formed in an annular supporting member 74. The annular supporting member 74 is secured at one end in the head block 55 and is arranged so as to project into the chamber 70 through the annular recess 75 formed within an head block 55.

Surrounding the annular supporting member 74 is an expansion spring 76, which engages at one end the inner surface of the head block 55 and exerts at the opposite end a biasing force upon the valve 71 tending to force the valve 71 toward conduit 69 so as to close the end thereof opening into the chamber 70. The chamber 70 as shown in Figure 6 has an outlet conduit 77 for connection to the exhaust conduit 33.

Likewise the chamber 64A has an outlet conduit 68A for connection to the conduit 32A and an outlet conduit 69A. The outlet conduit 69A is controlled at one end by the valve 66A and at the opposite end by a valve 71A. The valve 71A is carried by a pin 72A slidably mounted in a channel 73A formed in an annular supporting member 74A positioned in a recess 75A formed within the head block 55.

A helical expansion spring 76A surrounds the supporting member 74A and exerts a biasing force upon the valve 71A tending to move the valve 71A in a direction for closing the conduit 69A at the end opening into the chamber 70. The conduit 69A with the valve 71A in an open position leads into the chamber 70 previously noted.

Figure 10:
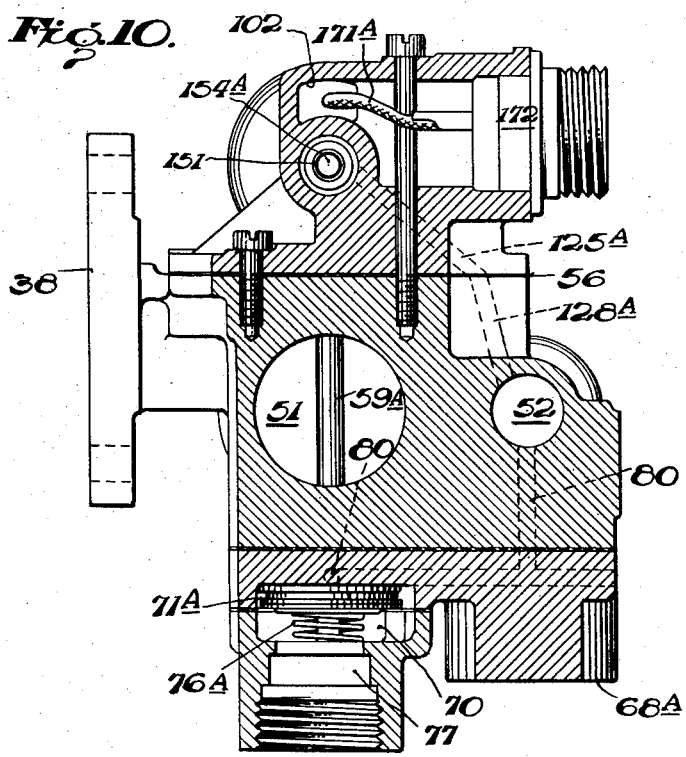
Figure 10 is a cross sectional view of Figure 6 taken along the lines 10—10 and looking in the direction of the arrows.

A duct 80A leads into the conduit 69A from the suction conduit 52 shown in dotted lines in Figure 10. A similar duct 80 leads from the suction conduit 52 into the conduit 69 as shown in Figure 6.

For controlling the operation of the aforenoted valves, we have provided a novel pilot control valve mechanism indicated generally by numeral 100 and including valve sleeves 101 and 101A fixedly mounted within a channel 102 formed in the head block 53. The valve sleeves 101 and 101A have provided concentric channels 103 and 103A, respectively. Formed in the outer edge of the valve sleeve 101 are spaced annular grooves 111, 112, 113, 114 and 115 having ports 116, 117, 118, 119 and 120 leading respectively from the said annular grooves into the channel 103. Likewise formed in the outer edge of the valve sleeve 101A are the spaced annular grooves 111A, 112A, 113A, 114A, and 115A from which extend ports 116A, 117A, 118A, 119A, and 120A leading into the channel 103A.

Figure 9:
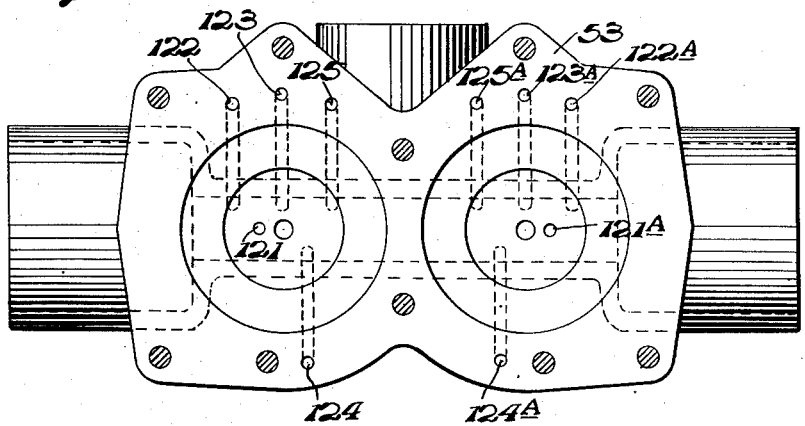
Figure 9 is a cross sectional view of Figure 6 taken along the lines 9—9 and looking in the direction of the arrows.

As shown in Figures 6 and 9, a duct 121 formed in the head portion 53 leads from the recessed chamber 57 into the annular groove 112, while a duct 121A likewise formed in the head portion 53 leads from the recessed chamber 57A into the annular groove 112A.

Ducts 122, 123, 124, and 125 formed in the head block 53 lead into the annular grooves 111, 113, 114, and 115, respectively, while ducts 122A, 123A, 124A, and 125A formed in the head block 53 lead into the annular grooves 111A, 113A, 114A, and 115A, respectively. The said ducts are shown in Figure 9.

A duct 126, Figures 7 and 8, formed in the manifold block 50 leads from the pressure conduit 51 into the duct 123 formed in the head block 53. A similar duct 126A formed in the manifold block 50 leads from the pressure conduit 51 into the duct 123A.

Ducts 127 and 128 formed in the manifold block 50, as shown in Figures 7 and 8, lead, respectively, from the suction manifold 52 into the ducts 122 and 125 formed in the head block 53. Similarly ducts 127A and 128A, shown in Figures 7 and 10, lead from the suction manifold 52 into the ducts 122A and 125A formed in the head block 53.

Further a duct 129 leads from the recessed chamber 58 into the duct 124, while a duct 129A leads from the recessed chamber 58A into the duct 124A, Figures 7 and 8.

Valve stems 150 and 150A are slidably mounted within the valve channels 103 and 103A, respectively. An expansion spring 151 is positioned between the opposite ends of the said valve stems 150 and 150A so as to bias the stem 150 toward the left and the stem 150A toward the right, as viewed in Figures 5 and 6. Carried by the valve stem 150 are valve members 152, 153, and 154, as shown in Figure 5. The said valve members are positioned within the valve channel 103 and are mounted on the valve stem 150 in spaced relation. The valve member 152 controls the opening of the port 116 leading into the channel 103, while the valve member 154 controls the opening of the port 120 leading into the valve channel 103. The valve member 153 controls the outlet from the port 118 leading into the valve channel 103.

Similarly the valve stem 150A has provided the spaced valve members 152A, 153A, and 154A, which control, respectively, the ports 116A, 118A, and 120A leading into the valve channel 103, as shown in Figure 5.

Armatures 155 and 155A shown in Figure 6 are mounted at the outer free ends of the valve stems 150 and 150A for actuation upon energization of electromagnets 156 and 156A, respectively.

The electromagnets 156 and 156A are mounted within suitable casings 157 and 157A, which are positioned in recesses 158 and 158A, respectively, formed in the head block 53. The casing 157 has provided the end plates 159 and 160, while the casing 157A has provided corresponding end plates 159A and 160A.

The end plates 159 and 159A have provided annular members 161 and 161A arranged to limit the movement of the valve stems 150 and 150A, respectively, under the biasing force of the spring 151 by engaging the valve members 152 and 152A, respectively, at the limit of such movement.

A portion 162 of the end plate 159 is positioned concentrically within the electromagnet 156 and has formed therein a recess 163 adapted to receive a portion of the armature 155 so as to limit the movement of the armature 155 in response to the electromagnet 156.

The end plate 159A has similarly provided the portion 162A having formed therein the recess 163A for receiving a portion of the armature 155A. In Figure 6 the armature 155 is shown actuated by the biasing force of the spring 151 upon the electromagnet 156 being de-energized, while the armature 155A is shown actuated by the electromagnet 156A upon the energization thereof.

End plates 165 and 165A fit within the recesses 158 and 158A and are conveniently locked in position by split rings 166 and 166A mounted in suitable annular grooves and formed in the inner surface of the respective recesses 158 and 158A. Thus the casing 157 and 157A, housing the electromagnets 156 and 156A, and the armature portions 155 and 155A of the valve stems 150 and 150A, are conveniently locked in position within the head block 53.

One terminal of each of the electromagnets 156 and 156A is preferably grounded, while the opposite terminal is connected by a conductor 171 and 171A, respectively, to a socket 172 of conventional type for connection to a control circuit. The control circuit is indicated generally in Figure 1 by numeral 173 and the same may be controlled by any suitable means known in the art, but is preferably controlled by an electronic timer 174 of the type described in the copending application of Myron L. Taylor, William B. Pond, and Herbert A. Eayrs, Serial No. 492,250 filed August 11, 1943, now U. S. Patent No. 2,444,208, granted June 29, 1948, and owned by the assignee of the present application, or a timer of the type shown in Figure 21, as will be explained hereinafter.

In operation it will be readily seen that upon closing the electric circuit controlling the solenoid 156 the armature 155 will be actuated from the position shown in Figure 6 toward the right to a position corresponding to that taken by the armature 155A of Figure 6. Upon being thus energized the electromagnet 156 will cause the valve stem 150 to be moved in such a manner that the valve member 152 will close the port 116 leading to the suction conduit 52, as described, and valve member 154 will open the port 120 likewise leading to the suction conduit 52. Also valve member 153 will be moved from a position to the left of the port 118 as shown in Figure 5 to a position to the right thereof. In the latter position of the valve stem 150 air in the conduit 51 under force of the pressure pumps 21, 22, 23 and 24 will enter the valve channel 103 through the duct 126, duct 123, annular groove 113, port 118, and pass through the valve channel 103 to the port 117, into the annular groove 112, and through the duct 121 to the recessed chamber 57.

Further the suction force generated by the suction pump 30 exerted through the conduit 52 will be transmitted through the duct 128, duct 125, annular groove 115, port 120, to the valve channel 103, through the valve channel 103, port 119, annular groove 114, duct 124, duct 129 to the recessed chamber 58.

The pressure medium entering the recessed chamber 57, together with the suction force exerted in the chamber 58, will counteract the biasing force exerted by the spring 151 in such a manner as to force the poppet valve 66 in a rapid action to a position corresponding to that shown by the poppet valve 59A in Figure 6, whereupon the ports 65 will be open and the conduit 69 closed at the inlet to chamber 64.

Upon opening the ports 65, the pressure medium within the conduit 51 will enter the chamber 64 and pass out the conduit 68 into the conduit 32 for inflating the tubes 12 and 14 previously noted.

The tubes 12 and 14 will remain inflated for a period determined by the timer 174. Upon the timer 174 opening the circuit to the electromagnet 56 the spring 151 will bias the armature 155 to the position shown in Figures 5 and 6, whereupon the valve member 152 will open the port 116 and the valve member 154 will close the port 120.

Further, the valve member 153 will be adjusted by the said movement of the valve stem 150 to a position to the left of the port 118, as shown in Figure 5.

In the latter position the force of the pressure medium transmitted from the conduit 57 to the port 118, as previously noted, will enter the valve channel 103 and be transmitted through the port 119, annular groove 114, and duct 124, duct 129, to the recessed chamber 58, exerting a pressure on the plate 62 which will act with the biasing force of the spring 63. Further the suction force exerted through the conduit 52 will be conducted through duct 127, duct 122, annular groove 111, port 116, to the valve channel 103, through port 117, annular groove 112, duct 121 to the recessed chamber 57, removing the pressure medium therefrom and causing the valve stem 59 to move the poppet valve 66 in a rapid action from the previous position to that shown in Figure 6, whereupon the poppet valve 66 will close the ports 65 leading to the pressure conduit 51, and open the end of the conduit 69 opening into the chamber 64. Upon the opening of the said end of conduit 69, the force exerted through the chamber 64 by the pressure medium within the tubes 12 and 14 will act upon the valve 71 in such a manner as to counteract the biasing force of the spring 76 and cause the valve 71 to open the conduit 69 at the end leading into chamber 70, as shown in Figure 6, so that the pressure medium will flow into the chamber 70, through the exhaust conduit 77, and out the exhaust conduit 33.

Upon a substantial portion of the pressure medium contained by the tubes 12 and 14 having been exhausted, and the force exerted thereby thus reduced to a predetermined minimum value, the spring 76 is arranged to exert a biasing force sufficient to overcome the force exerted by the reduced pressure medium on the valve 71, so that the valve 71 will be biased by the spring 76 to a position closing the entrance of the conduit 69 to the chamber 70.

In the latter position of the valve 71, the suction force exerted within the conduit 52 will act through the duct 80, opening into conduit 69 so as to draw through conduit 69, chamber 64, conduit 68, and conduit 32, the remaining pressure medium from the tubes 12 and 14 for completely deflating the same. The tubes 12 and 14 are thus held under this suction force in a completely deflated condition, until such time as the timer 174 once again closes the circuit to the electromagnet 156 for energizing the same, whereupon the afore-described cycle of operation will be repeated.

The valve 59A shown in Figure 6 and the valve 59 are of like construction. The valve 59A is controlled by the electromagnet 156A and in operation is essentially the same as the valve 59 controlled by the electromagnet 156, as previously described. It should be noted, however, that the valve 59 in the instant disclosure controls the distribution of the pressure medium in the inflation and deflation of the boot tubes 12 and 14, while the valve 59A controls the distribution of the pressure medium in the inflation and deflation of the boot tube 13. The timing of the operation of each of the electromagnets 156 and 156A in the distributor valves 31 and 38, Figure 1, is controlled by the timer 174, which is preferably of the type described in the copending application of Myron L. Taylor, William B. Pond, and Herbert A. Eayrs, Serial No. 498,250, filed August 11, 1943, now U. S. Patent No. 2,444,208, granted June 29, 1948, and which is owned by the assignee of the present application, or a timer of the type shown in Figure 21 or any other suitable type.

Our distribution system, as shown in Figure 1, is symmetrical, in that the units mounted on the starboard side of the airplane follow the arrangement on the port side. Moreover the control circuit is so arranged as to cause the operation in unison of corresponding units mounted at opposite sides of the plane. Thus for example tubes 13 of the units 5 and 5A are inflated and deflated in unison through the joint operation of the distributor valves 31A and 31B, respectively. Similarly the control circuit is arranged to cause the operation in unison of the pairs of distributor valves 31B and 31G; 31C and 31F; and 31D and 31E for inflating and deflating the units controlled thereby.

Through such symmetrical arrangement and operation, the drag applied at opposite sides of the airplane, due to the inflation of the units will counter-balance so as to thereby prevent the unbalancing of the plane. This mode of operation is possibly best shown by the electrical control circuit of Figure 21.

In Figure 21 we have shown diagrammatically a modified form of electrical timer for operating our pressure distribution system of Figure 1. Corresponding numerals are used in Figure 21 to indicate like parts to those previously shown and described.

As shown in Figure 21 a control circuit 200 is provided having a timer indicated by the numeral 201. The timer 201 is of the rotary type and comprises a rotary arm 202 driven by an electric motor 203 so as to open and close in sequence control contacts indicated generally by the numeral 204. The circuit 200 controls the energization of the electromagnets 156 and 156A of distributor valves 31, previously described.

Figure 11:
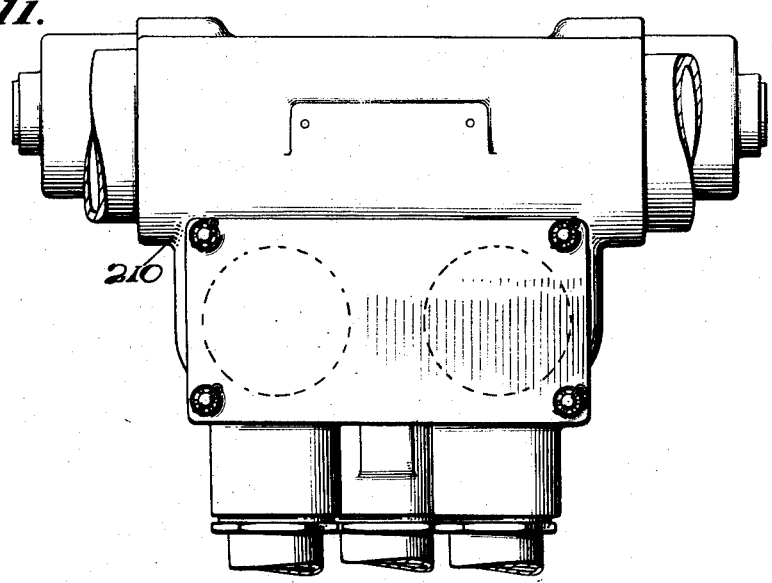
Figure 11 is an enlarged inverted end view of modified form of our distributor valve.
Figure 12:
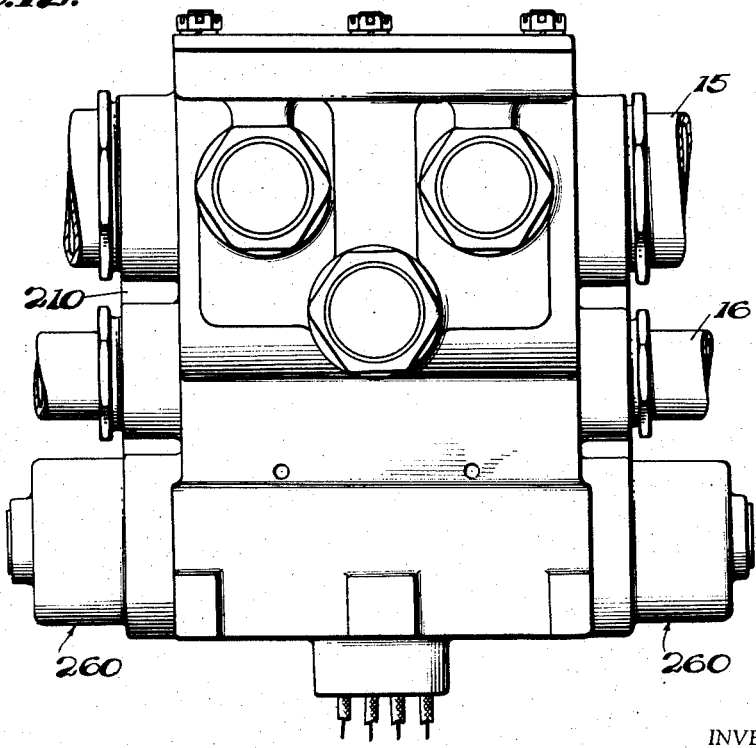
Figure 12 is a top plan view of the device shown in Figure 11.

The control contacts 204, as shown in Figure 11, vary in size so that the period of energization of each of the said electromagnets will be in proportion to the time interval required to properly inflate the respective tubes controlled thereby, which time interval may be based upon the proportionate capacity of the respective tubes.

The rotary arm 202 moves in engaging relation along a ring 205, which electrically connects the arm 202, through an electrical conductor 207, to one terminal of a suitable source of electrical energy 208. A switch 209 is arranged to open and close the circuit to the source of electrical energy 208. The opposite terminal of the source of electrical energy 208 is grounded as shown in Figure 21.

Thus upon the switch 209 being closed, the arm 202 on contacting one of the contacts 204 will close a circuit to the electromagnet controlled thereby, causing a flow of electronic energy to pass through the switch 209, conduit 207, ring 205, arm 202, circuit 200, through the electromagnet connected to the closed circuit, and returning through the grounded connection of such electromagnet, as shown, to the grounded opposite terminal of the source of electrical energy 208.

Thus the closing of any one of the contacts 204 will cause the energization of the corresponding electromagnets connected to the closed circuit for effecting the operation of the distributor valve controlled thereby, as heretofore described.

The arm 202 is driven by the shunt motor 203 energized by a suitable source of electrical energy indicated by the numeral 210, such as an aircraft motor driven generator, battery, or other suitable means. A switch 211 is provided for controlling the motor circuit.

There is further connected in the motor circuit a variable resistance 212 whereby the speed of rotation of the motor may be varied. It will be seen that by varying the speed of rotation of the motor 203 the period of inflation of each unit may be proportionately increased or decreased with the variance of the speed of the motor. Thus we have provided convenient means whereby the period of inflation of the units may be varied so as to compensate for changes in icing conditions. Thus under relative hard ice conditions the motor 203 may be driven at a relatively slow rate of speed so as to increase the inflation period while under slushly or soft ice conditions the more rapid inflation and deflation of the units may be affected by increasing the speed of the motor 203 through adjustment of the variable resistance 212. The more efficient ice removal may thereby be effected.

Referring to Figures 11 through 20, there is shown thereby a modified form of distributor valve, which may be readily substituted in Figures 1 and 21 for the distributor valve 31 shown therein. The modified form of distributor valve has provided a manifold block 210, which has formed therein a pressure channel 211 and a suction channel 212 which are preferably screwthreaded at the inner ends for receiving corresponding screw threaded ends of the main air pressure and suction conduits 15 and 16, respectively, shown in Figure 1.

There is further provided in the manifold block 210, as shown in Figure 20, a plurality of valve cylinders 212 in which are mounted the pressure distributor valve mechanism. Since the valve mechanism in each cylinder is of identical construction and operation, only one will be described and like numerals apearing with reference to each valve mechanism indicate like parts.

Referring then to Figures 16 and 20, it will be seen that there is fixedly positioned within the cylinder 212 a sleeve 213 having formed therein ports 214, 215, 216, 217, and 218. The port 216 leads from the interior of the sleeve 213 to the atmosphere through a bleed port 219 formed in the block 210 for a purpose which will be explained hereinafter. Slidably mounted within the sleeve 213 for controlling the openings of the ports 214, 215, and 217 is a piston sleeve 220 having formed in the side walls thereof ports 221, 222, and 223. The ports 222 and 223, as shown in Figures 16, 17 and 18, are positioned at opposite sides of the piston sleeve 220 and are arranged to open the ports 214 and 218, respectively, upon downward movement of the piston sleeve 220 as viewed in Figure 17, while the port 221 is arranged to open the port 214 upon upward movement of piston 220, as viewed in Figures 16 and 18. The piston sleeve 220 is open at one end thereof and closed at the opposite end by a plate 224. A second plate 225 partitions the interior of the sleeve 220 so as to form a chamber 226 into which chamber lead the ports 222 and 223. The port 221 leads into the interior of the sleeve 220 at the opposite side of the plate 225 so that the chamber 226 is closed to the port 221.

The plate 224 and sleeve 220 are fixedly mounted by means of a nut 227 to one end of an actuating rod 228. The actuating rod 228 has fixedly mounted at the opposite end by means of a nut 229 a valve plunger 230 slidably mounted within the sleeve 213.

Positioned intermediate the valve plunger 230 and the sleeve 220 for controlling the ports 217 and 215, is a second valve sleeve 231. The valve sleeve 231 is open at one end thereof and closed at the opposite end by a frustopyramidal end member 232, which projects into the valve sleeve 231. The end member 232 carries a collar 233 slidably positioned on the rod 228. The collar 233 projects from opposite sides of the frustopyramidal end member 232. A helical compression spring 234 surrounds the collar 233 and projects into the frustopyramidal portion of the end member 231 between the plunger 230 and the end member 232 so as to bias the open end of the sleeve 231 into releasable engaging relation with the open end of the sleeve 220, as shown in Figures 16 and 17.

It will thus be seen that there is formed between the plate 225 and the frustopyramidal end member 232 a second chamber 235, while between the frustopyramidal end member 232 and the valve plunger 230 is formed a third chamber 236.

As shown in Figures 16 and 18, the port 221 leads into the chamber 235. Further formed within the sleeve 231 is a port 237 arranged to open the port 217 leading into the chamber 235 upon upward movement of the piston sleeve 220 followed by a corresponding upward movement of the piston sleeve 231, as viewed in Figure 16.

A notch 238 is formed in the sleeve 231 for permitting ingress and egress of atmospheric air at all times to the chamber 236 through the ports 216 and 219.

As shown in Figures 16, 17 and 18, the port 218 is connected through a channel 250 to the main pressure channel 211, while the oppositely disposed port 214 is connected through a channel 251 to a conduit leading to a tube for the inflation or deflation thereof.

Further the port 215 opens into channel 252 leading to a suitable exhaust or overboard conduit, as shown in Figure 18, while the port 217 is connected through a channel 253 to the main suction channel 212.

As shown in Figures 13 and 14, a screw 240 having a pin 241 formed at the inner end thereof projects through the block 210 and sleeve 213. The pin 241 slides longitudinally in a slot 242 formed in the valve piston sleeve 220 and prevents rotary movement of the piston sleeve 220 in relation to the block 210. There is further provided a pin 243, which projects from the actuating rod 228 and is slidably mounted in a slot 244 formed in the collar 233 so as to prevent rotary movement of the valve sleeve 231 in relation to the valve piston sleeve 220.

For controlling the operation of the aforenoted distributor valve mechanism, we have provided a novel pilot control valve indicated generally by the numeral 260 and somewhat similar to the pilot control 100 previously described.

In the modified form of our invention, we have provided the annular valve sleeve 261 fixedly mounted within a channel 262 formed in the manifold block 210, as shown in Figure 15. Concentrically positioned within the valve sleeve 261 is a channel 263. Formed in the outer edge of sleeve 261 are spaced annular grooves 264, 265, 266, 267 and 268 which are connected through suitable ports to the channel 263.

As shown in Figures 15 and 16, a duct 269 leads from the main pressure channel 211 to the annular groove 266. As further shown in Figures 15, 19 and 22, ducts 270 and 271 lead from the main suction channel to the annular grooves 264 and 268, respectively.

Further, as shown in Figures 14, 15, and 16, a duct 272 leads from the annular groove 265 to an annular groove 273 formed in the block 210 and surrounding the sleeve 213, while a second duct 274 leads from the annular groove 267 to an annular groove 275 likewise formed in the block 210 and surrounding the sleeve 213.

A channel 276 leads from the annular groove 273 formed in the block 210 to a port 277 provided in the sleeve 213 at one extreme end thereof, while a channel 278, Figures 13, 17 and 20 leads from the other annular groove 275 to a port 279 formed in the sleeve 213 at the opposite extreme end. As shown in Figure 16, the opposite ends of the sleeve 213 are sealed by plates 280 and 281 fastened to the manifold block 210 by suitable fastening bolts. Thus it will be readily seen that upon pressure being inserted into the sleeve 213 through the port 277, the biasing force of such pressure exerted upon the plunger 230 will force the plunger 230 and valve piston 220 toward the port 279, while upon pressure being inserted into the sleeve 213 through the port 279, the valve piston 220 and plunger 230 will be moved in the opposite direction.

A splint spring ring 282 is mounted in an annular groove 283 formed in the inner surface of the sleeve 213. The ring 282 is positioned between the valve plunger 230 and the valve sleeve 231 so as to limit the movement of the piston valve sleeve 220 and the valve plunger 230 in response to the aforesaid pressure forces and thereby prevent the closing of either port 277 or port 279 by the said valve members at the extreme end of either movements.

In order to control the direction of application of the aforesaid forces is slidably mounted within the valve channel 263 a valve stem 300, which has mounted thereon in spaced relation valve members 301, 302, and 303, as shown in Figure 15.

The valve member 301 controls the opening of the ports leading to the annular groove 264, while the valve member 303 controls the opening of the ports leading to the annular groove 268. The valve member 302 controls the outlet from the ports leading from the annular groove 266.

An armature 304 is mounted at the outer free end of the valve stem 300 and slidably positioned within an electromagnet 205 about which there is positioned a suitable casing 312. A spring 310 is mounted at one end in an adjustment screw 313 screw threadedly engaged in the outer end of the casing 312. The spring 310 biases at the opposite end the armature 304 longitudinally toward the valve sleeve 261, while the electromagnet 205 upon energization counteracts the biasing force exerted by the spring 310 and actuates the valve stem 300 longitudinally toward the electromagnet 205. As shown at the left of Figure 15, the armature 304 is shown in the actuated position upon energization of the electromagnet 205, while at the right of Figure 15, the armature 304 is shown biased under the force of the spring 310 with electromagnet 205 de-energized. Energization of the electromagnet 205 is controlled through the electrical conductors 314 and 315, positioned in a channel 316 formed in the block 310 and leading to a suitable terminal socket 317.

In the former position with electromagnet 205 energized, the duct 271 is shown closed by the valve member 303 and the valve member 302 adjusted to a position between the ports leading from the annular groove 266 and the ports leading from the annular groove 265. In such valve position, a pressure medium such as air will be conducted from the main pressure channel 211, through the duct 269 to the annular groove 266, through the ports leading therefrom into the valve channel 263, and through the ports leading to the annular groove 267, through duct 274, annular groove 275, channel 278, and out port 279, exerting a biasing force upon the plate 224 tending to bias the piston valve sleeve 220 and valve plunger 230 toward the plate 281. Further upon energization of the electromagnet 205, the valve member 301, as shown to the left of Figure 15, will uncover the ports leading from the annular groove 264, so that suction will be exerted at the opposite end of the sleeve 213 through the port 277, channel 276, annular groove 273, duct 272, annular groove 265, through the ports leading from the annular groove 265, into the valve channel 263, and then through the ports leading to the annular groove 264, and through duct 270 to the main suction channel 212. The application of suction to the said opposite end of the sleeve 213 will remove any pressure medium which may have accumulated at such point, through previous operation. The application of pressure and suction, as thus indicated, will cause the movement of the piston valve sleeve 220 and valve plunger 230 from a position such as shown in Figure 16, to the position shown in Figure 17.

Moreover, upon the de-energization of the electromagnet 205, the armature 304 will be biased by the spring 310 into the position shown to the right of Figure 15, whereupon the valve member 301 will close the ports leading from the annular groove 264, and the valve member 302 will be adjusted to a position between the ports leading from the annular groove 267 and the ports leading from the annular groove 266. In such valve position, a pressure medium such as air will be conducted from the main pressure channel 211, through the duct 269 to the annular groove 266, through the ports leading therefrom into the valve channel 263, and through the ports leading to the annular groove 265, through duct 272, annular groove 273, channel 276 and out port 277, exerting a biasing force upon the valve plunger 230 tending to bias the valve plunger 230 and piston valve sleeve 220 toward the plate 280.

Further the valve member 303, as shown at the right of Figure 15, will uncover the ports leading from the annular groove 268 so that suction will be exerted at the opposite end of the sleeve 213, through the port 279, channel 278, annular groove 275, duct 274, annular groove 267, through the ports leading from the annular groove 267 into the valve channel 263, and then through the ports leading to the annular groove 268 and through duct 271 to the main suction channel 212. The application of suction to the said opposite end of the sleeve 213 will remove any pressure medium present at such end of the sleeve 213 due to the previous operation. The application of such pressure and suction forces will then cause movement of the piston valve sleeve 220 and valve plunger 230 from a position such as shown in Figure 17 to the position shown in Figure 16.

The cycle of operation of our pressure distributor valve is readily shown in Figures 16, 17 and 18. Figure 16 illustrates the distributor valve mechanism in the normal rest position with the tube deflated and suction applied to the deflated tube from the main suction channel 212, through the channel 253, port 217, port 237, through the chamber 235, port 221, port 214, channel 251, to the tube.

The electromagnet 205 in the latter position of the valve mechanism is of course de-energized and the pilot control valve members 301, 302 and 303 adjusted so as to cause the application of a pressure medium to the valve plunger 230 through the port 277, and the application of suction at the opposite end of the valve sleeve 213 through the port 279 as previously explained.

If the modified form of distributor valves be connected in the control circuit shown in Figure 21 in place of the distributor valves 31, it will be readily apparent that upon the rotary arm 202 closing the control contact 204 for making the circuit 200, causing the energization of the electromagnet 205 the valve stem 300 will be actuated. The actuation of the valve stem 300 will cause the valve members 301, 302 and 303 to move so as to apply the pressure medium through the port 279 and suction force through the port 277 whereupon the distributor valve mechanism will be actuated to the position shown in Figure 17. In the latter position the valve sleeve 231 will close the port 217 to the main suction channel and port 221 of the piston valve sleeve 220 will be closed by the sleeve 213. Further in the latter position, pressure medium will be applied to the tube from the main pressure channel 211, through channel 250, port 218, port 223, through chamber 226, through port 222, port 214, and into channel 251 to the tube, causing the inflation thereof.

Upon the time interval for inflation of the tube, as determined by the timer 201, having elapsed the said timer will open the control circuit causing the deenergization of the electromagnet 205, whereupon the pilot control valve stem 300 will adjust the valve members 301, 302, and 303 to the previous position. The said valve member will be then adjusted so as to cause the application of the pressure medium to the distributor valve mechanism through the port 277, and the application of suction through the port 279, causing the movement of the piston valve sleeve 220 toward the port 279, whereupon the ports 222 and 223 in the piston valve sleeve 220, will be closed by the sleeve 213 and the port 218 leading to the main pressure channel 211 closed by the piston valve sleeve 213. Further upon such movement of the distributor valve mechanism the port 221 will cause an opening of the port 214 leading to the inflated tube, through channel 251. The port 221 is positioned so as to open the port 214 before the port 237 can open the port 217 leading to the main suction channel 212. Thus upon the port 221 opening the port 214, the inflation medium such as air, under pressure within the inflated tube will flow into the chamber 235 before suction pressure sufficient to remove such medium is applied through the port 237. The pressure exerted by such medium will then exert a force upon the frustopyramidal end member 232, counteracting the biasing force of the spring 234, and causing the valve sleeve 231 to be slidably adjusted within the sleeve 213 so that the open end of the sleeve 231 will disengage the open end of the piston sleeve 220 and move in spaced relation thereto. The open end of the valve sleeve 231, thus separating from the piston sleeve 220 under the biasing force of the pressure medium, will open the chamber 235 to the port 215 leading through the channel 252 to an overboard or exhaust conduit. Moreover such movement of the valve sleeve 231, under the biasing force of the pressure medium, will prevent the opening of the port 217 by the port 237, as shown in Figure 18. Upon the deflation of the tube, and on the pressure exerted by the medium flowing from the tube decreasing sufficiently for the biasing force of the spring 234 to overcome the biasing force of the pressure medium, the valve sleeve 231 will be biased by the spring 234 so as to cause the port 252 to be closed by the valve sleeve 231, and the port 237 to open the port 217 leading through the channel 253 to the main suction channel 212. Further pressure medium will then be drawn from the chamber 235 and the tube under suction causing the tube or tubes to be completely deflated. The distributor valve mechanism upon the opening of the port 217 will then return from a position such as shown in Figure 18, to the position shown in Figure 16. The bleed port 219 leading into the chamber 236 is of sufficient size to permit the ready flow of air in and out of the chamber 236 as the foregoing adjustment of the valve sleeve 231 is automatically effected in response to the force exerted by pressure medium flowing from the tube.

It will be seen, however, that by varying the speed of the rotation of the motor 203, the period of inflation and the period of deflation of the units may be readily varied.

Although only two embodiments of our novel system and distributor valves have been illustrated and described, various changes in the form and relative arrangement of the parts, which will now appear to those skilled in the art, may be made without departing from the scope of the invention. Reference is, therefore, to be had to the appended claims for a definition of the limits of the invention.

We claim:

1. A control apparatus for an inflatable element, said apparatus comprising a casing, a valve chamber formed therein, a main valve member displaceable in said valve chamber in a first sense and in a second sense, said casing having a main port, a pressure inlet port, a pressure exhaust port, and suction port means provided therein, all said ports opening into said valve chamber, a pair of compartments formed in said main valve member, and a wall for separating said compartments, one of said compartments containing apertures registrable with said main port and said pressure inlet port upon displacement of said main valve member in a first sense, the other of said compartments having an aperture registrable with said main port upon displacement of said main valve member in said second sense for permitting a pressure medium entering said main port to pass into said other compartment, and an additional valve member movable in a first sense relative to said main valve member under pressure from said main port for opening said exhaust port to said other compartment for releasing said pressure medium from said other compartment, means biasing said additional valve member in a second sense for closing said exhaust port upon the release of said pressure medium from said other compartment, said additional valve member having an aperture registrable with said suction port means for applying a suction force through said main port upon the release of said pressure medium and the closing of said exhaust port by said additional valve member.

2. A control apparatus for an inflatable element, said apparatus comprising, in combination, a casing, a first valve chamber formed therein, said casing having a main port, an air pressure inlet port, an air pressure exhaust port, and suction port means provided therein, all said ports opening into said first valve chamber, first and second valve members longitudinally movable in said first valve chamber, said first valve member having formed therein a second valve chamber, and said second valve member forming with said first valve member a third valve chamber, a spring means biasing said first and second valve members into engaging relation for forming said third valve chamber, said second valve chamber having apertures formed therein registrable with said main port and said air pressure inlet port upon longitudinal movement of said first valve member to a first position, said third valve chamber having formed in said first valve member an aperture registrable with said main port upon longitudinal movement of said first valve member to a second position, whereupon said second valve member may be biased by air pressure through said main port in such a manner as to disengage said first valve member and open said third valve chamber to said air pressure exhaust port, and said third valve chamber having formed in said second valve member an aperture registrable with said suction port means upon the biasing force of said spring means overcoming the biasing force of said air pressure, causing thereby the second valve member to be biased by said spring means into engaging relation with said first valve member so as to close said exhaust port and open said suction port means for supplying a suction force through said third valve chamber and said main port.

3. A control apparatus for an inflatable element, said apparatus comprising, in combination, a casing, a first valve chamber formed therein, said casing having a main port, a fluid pressure inlet port, a fluid pressure exhaust port, and suction port means provided therein, all said ports opening into said first valve chamber, a pair of control conduits, one of said conduits opening at one end of said first valve chamber and the other of said conduits opening at the other end of said first valve chamber, a valve piston slidably mounted in said first valve chamber, a valve plunger slidably mounted in said first valve chamber, a rod connecting said valve piston and said valve plunger, a valve member positioned intermediate said piston and said plunger, said valve member slidably mounted on said rod and within said first valve chamber, a spring biasing said valve member toward said valve piston, said valve piston having formed therein a second valve chamber and said valve piston forming with said valve member a third valve chamber, said second valve chamber having apertures formed therein registrable with said main port and said air pressure inlet port upon longitudinal movement of said valve piston to a first position, control means for supplying through said control conduits one end of said valve chamber with a fluid medium under pressure and the other end of said valve chamber with a suction force for biasing said valve piston to said first position and said third valve chamber having formed in said valve piston an aperture registrable with said main port upon longitudinal movement of said valve piston to a second position, said control means arranged for supplying through said control conduits said one end of said valve chamber with a suction force and said other end of said valve chamber with a fluid medium under pressure for biasing said valve plunger and thereby said valve piston to said second position, whereupon said valve member may be biased by a fluid medium under pressure entering said main port in a direction opposing the biasing force of said spring and toward said valve plunger, whereby said valve member may be moved so as to open said third valve chamber to said exhaust port for releasing said fluid pressure medium, and said third valve chamber having formed in said valve member an aperture registrable with said suction port means upon the biasing force of said spring overcoming the biasing force of the fluid pressure medium, whereby said valve member may be biased in an opposite direction so as to close said exhaust port and open said suction port means for supplying a suction force through said third valve chamber and main port.

4. In a device of the character described, comprising, in combination, an aircraft structure, a plurality of inflatable elements mounted on the exterior surface of said structure for removing ice therefrom, a first main conduit supplying a pressure medium for inflating said elements, a second main conduit supplying suction for holding said elements in a deflated condition, a plurality of manifold blocks, said mainfold blocks including first means for carrying said first and second main conduits, second means mounted on said manifold blocks for fastening said conduits to said aircraft structure, and automatic means for causing said blocks to distribute said pressure medium to said elements for inflating said elements in a predetermined sequence of operation.

5. A control apparatus for an inflatable element, said apparatus comprising a casing, a valve chamber formed therein, a main valve member displaceable in said valve chamber in a first sense and in a second sense, said casing having a main port, a pressure inlet port, a pressure exhaust port, and suction port means provided therein, all said ports opening into said valve chamber, a pair of compartments formed in said main valve member, and a wall for separating said compartments, one of said compartments containing apertures registrable with said main port and said pressure inlet port upon displacement of said main valve member in a first sense, the other of said compartments having an aperture registrable with said main port upon displacement of said main valve member in said second sense for permitting a pressure medium entering said main port to pass into said other compartment, and an additional valve member movable in a first sense relative to said main valve member under pressure from said main port for opening said exhaust port to said other compartment for releasing said pressure medium from said other compartment, means biasing said additional valve member in a second sense for closing said exhaust port upon the release of said pressure medium from said other compartment, said additional valve member having an aperture registrable with said suction port means for applying a suction force through said main port upon the release of said pressure medium and the closing of said exhaust port by said additional valve member, a fluid pressure sensitive member to operably displace said valve members, said fluid pressure sensitive member formed with portions movably mounted in said valve chamber, and means including a rod interconnecting said portions and said first mentioned valve member, and said additional valve member slidably mounted on said rod for controlling said exhaust conduit and said suction port means.

6. A control apparatus for an inflatable element, said apparatus comprising a manifold block, a main fluid pressure supply conduit extending through said block, a main suction conduit extending through said block in parallel relation to said main pressure supply conduit, a valve chamber formed in said block, a valve member displaceable in said chamber in a first and in a second sense, a main port opening from said chamber, a fluid pressure inlet port opening from said main fluid pressure supply conduit into said chamber, a suction port opening from said main suction conduit into said chamber, a fluid pressure exhaust port opening from said chamber to atmosphere, said valve member opening said fluid pressure inlet port to said main port and closing the exhaust and suction ports to the main port upon displacement of said valve member in said first sense, said valve member closing said fluid pressure inlet port to the main port and opening said exhaust and suction ports to said main port upon displacement of said valve member in said second sense, fluid pressure motor means for displacing said valve member, conduit means operably connecting said fluid pressure motor means to said main suction and fluid pressure conduits, servo valve means for controlling the connection of said main suction and fluid pressure conduits to said fluid pressure motor for effecting displacement of said valve member in said first and second senses, and another valve member for closing said exhaust port to atmosphere in response to a predetermined decrease in the fluid exhaust pressure.

7. A system for removal of ice from an aircraft, comprising, a plurality of inflatable units of different capacity, a fluid pressure supply line for said units, and outlet means therefor; a plurality of distributor mechanisms for the units, there being a distributor mechanism individual to each unit; said distributor mechanism including valve means for connecting said unit to said fluid pressure supply line to inflate said unit and alternately to said outlet means to deflate said unit; an electromagnetic means carried by each of said distributor mechanisms, said electromagnetic means operably connected to control said valve means and thereby the duration of inflation of said unit; electrical circuits for separately energizing each of said electromagnetic means; timing means common to said distributor mechanisms, said timing means including a pair of relatively movable contact structures, motor means for rotating said contact structures relative one to the other and at a predetermined constant rate of speed; one of said contact structures including a plurality of contact segments of different length serially arranged in spaced relation, each of said contact segments having a length proportionate to the relative capacity of the inflatable unit controlled thereby and sequentially closed by the other contact structure to cause energization of each electromagnetic means for a predetermined duration proportionate to the relative capacity of said inflatable unit.

8. The combination defined by claim 7 including operator-operative means to vary the relative speed of rotation of said contact structures and thereby the duration of inflation of each of said units in proportion to the relative capacity of said units.

9. A device of the character described, comprising, in combination, an aircraft structure, a plurality of inflatable boots of different capacity mounted on the exterior surface of said structure for removing ice therefrom, a first main conduit supplying a pressure medium for inflating said boots, a second main conduit supplying suction for holding said boots in a deflated condition, a plurality of manifold blocks supporting said first and second conduits within said aircraft structure; each of said manifold blocks having the main fluid pressure supply conduit and the main suction conduit extending through said block in parallel relation, a valve chamber formed in said block, a valve member displaceable in said chamber in a first and in a second sense, a main port opening from said chamber to one of said inflatable boots, a fluid pressure inlet port opening from said main fluid pressure supply conduit into said chamber, a suction port opening from said main suction conduit into said chamber, a fluid pressure exhaust port opening from said chamber to atmosphere, said valve member opening said fluid pressure inlet port to said main port and closing the exhaust and suction ports to the main port upon displacement of said valve member in said first sense, said valve member closing said fluid pressure inlet port to the main port and opening said exhaust and suction ports to said main port upon displacement of said valve member in said second sense, fluid pressure motor means for displacing said valve member, conduit means operably connecting said fluid pressure motor means to said main suction and fluid pressure conduits, servo valve means for controlling the connection of said main suction and fluid pressure conduits to said fluid pressure motor for effecting displacement of said valve member in said first and second senses, and another valve member for closing said exhaust port to atmosphere in response to a predetermined decrease in the fluid exhaust pressure, an electromagnetic winding for biasing said servo valve means in a direction for effecting displacement by said motor means of said first mentioned valve member in said first sense; and timing means common to the electromagnetic windings of said manifold blocks to cause energization of each of said electromagnetic windings for a predetermined duration proportionate to the capacity of the inflatable boot controlled thereby.

10. The combination defined by claim 9 in which said timing means includes a pair of relatively movable contact structures, motor means for rotating said contact structures relative one to the other and at a predetermined constant rate of speed, one of said contact structures including a plurality of contact segments of different length serially arranged in spaced relation, each of said contact segments having a length proportionate to the relative capacity of the inflatable boot controlled thereby and sequentially closed by the other contact structure to cause energization of each of the electromagnetic windings for a predetermined duration proportionate to the relative capacity of said inflatable boot.

11. The combination defined by claim 9 including operator-operative means to vary the relative speed of rotation of said contact structures and thereby the duration of inflation of each of said boots in proportion to the relative capacity of said boots.

DONALD M. LAWRENCE.
DAVID GREGG.
MYRON L. TAYLOR.

REFERENCES CITED

The following references are of record in the file of this patent:

UNITED STATES PATENTS

| Number | Name | Date |
|---|---|---|
| 361,779 | Reynolds | Apr. 26, 1887 |
| 833,307 | Dake | Oct. 16, 1906 |
| 895,426 | Cable | Aug. 11, 1908 |
| 1,410,098 | Hamilton | Mar. 21, 1922 |
| 1,583,122 | Bryant | May 4, 1926 |
| 2,038,039 | Gregg | Apr. 21, 1936 |
| 2,089,173 | Brown | Aug. 10, 1937 |
| 2,095,833 | Rockwell | Oct. 12, 1937 |
| 2,217,299 | Taylor | Oct. 8, 1940 |
| 2,223,570 | McMillin | Dec. 3, 1940 |
| 2,335,923 | Dube | Dec. 7, 1943 |
| 2,337,426 | Taylor et al. | Dec. 21, 1943 |
| 2,343,918 | McCoy | Mar. 14, 1944 |

Certificate of Correction

Patent No. 2,515,519                                          July 18, 1950

DONALD M. LAWRENCE ET AL.

It is hereby certified that error appears in the printed specification of the above numbered patent requiring correction as follows:

Column 22, line 13, for the claim reference numeral "9" read *10*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*